United States Patent
Horneman et al.

(10) Patent No.: US 9,775,074 B2
(45) Date of Patent: Sep. 26, 2017

(54) MOBILITY MANAGEMENT BASED ON TRANSMISSION RATE HISTORY

(71) Applicant: NOKIA SOLUTIONS AND NETWORKS OY, Espoo (FI)

(72) Inventors: Kari Veikko Horneman, Oulu (FI); Mehdi Bennis, Oulu (FI)

(73) Assignee: Nokia Solutions and Networks OY, Espoo (FI)

(*) Notice: Subject to any disclaimer, the term of this patent is extended or adjusted under 35 U.S.C. 154(b) by 0 days.

(21) Appl. No.: 15/027,642

(22) PCT Filed: Oct. 11, 2013

(86) PCT No.: PCT/EP2013/071237
§ 371 (c)(1),
(2) Date: Apr. 6, 2016

(87) PCT Pub. No.: WO2015/051849
PCT Pub. Date: Apr. 16, 2015

(65) Prior Publication Data
US 2016/0242077 A1    Aug. 18, 2016

(51) Int. Cl.
*H04W 36/00* (2009.01)
*H04W 36/22* (2009.01)
*H04W 36/32* (2009.01)

(52) U.S. Cl.
CPC ... *H04W 36/0016* (2013.01); *H04W 36/0044* (2013.01); *H04W 36/22* (2013.01); *H04W 36/32* (2013.01)

(58) Field of Classification Search
CPC ........................................................ H04W 36/01
USPC .................................................. 455/457–459
See application file for complete search history.

(56) References Cited

U.S. PATENT DOCUMENTS

2011/0090871 A1* 4/2011 Kim .................. H04W 36/0044
370/332
2014/0204771 A1* 7/2014 Gao ...................... H04W 36/28
370/252

FOREIGN PATENT DOCUMENTS

EP    2555561 A1    2/2013

OTHER PUBLICATIONS

International Search Report and Written Opinion for International Application No. PCT/EP2013/071237, mailed Jul. 10, 2014, 16 pages.
3GPP TS 36.423 V11.6.0 (Sep. 2013); 3rd Generation Partnership Project; Technical Specification Group Radio Access Network; Evolved Universal Terrestrial Radio Access Network (E-UTRAN); X2 application protocol (X2AP) (Release 11).

* cited by examiner

*Primary Examiner* — Michael T Vu
(74) *Attorney, Agent, or Firm* — Brake Hughes Bellermann LLP (57) ABSTRACT

Mobility management mechanism wherein a source base station is configured to send to a target base station the transmission rate history of a user equipment to be handed off from the source base station to the target base station.

13 Claims, 6 Drawing Sheets

MOBILITY MANAGEMENT BASED ON TRANSMISSION RATE HISTORY

This application is a national stage entry of PCT Application No. PCT/EP2013/071237, filed Oct. 11, 2013, entitled "MOBILITY MANAGEMENT BASED ON TRANSMISSION RATE HISTORY" which is hereby incorporated by reference in its entirety.

BACKGROUND

Field

The present invention relates to apparatuses, methods, systems, computer programs, computer program products and computer-readable media usable for conducting a mobility management control in a communication network.

Background Art

The following description of background art may include insights, discoveries, understandings or disclosures, or associations, together with disclosures not known to the relevant art prior, to at least some examples of embodiments of the present invention but provided by the invention. Some such contributions of the invention may be specifically pointed out below, whereas other such contributions of the invention will be apparent from their context.

The following meanings for the abbreviations used in this specification apply:
 BS: base station
 CPU: central processing unit
 DL: downlink
 E-UTRAN: evolved UMTS radio access network
 eNB: evolved node B
 LTE: Long Term Evolution
 LTE-A: LTE Advanced
 MBS: macro cell base station
 MUE: macro cell user equipment
 QoS: quality of service
 SBS: small cell base station
 UE: user equipment
 UL: uplink
 UMTS: universal mobile telecommunication system In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user device or user equipment (UE) and another communication network element or user device, a database, a server, host etc., one or more intermediate network elements such as communication network control elements, such as access points, base stations, control nodes, support nodes or service nodes are involved which may belong to different communication network.

Basically, a communication network is typically divided into several cells controlled by a communication network control element like a BS, eNB, and the like, which can communicate with one or more UEs e.g. via an air interface. In case a UE connected to one serving BS leaves the coverage area (i.e. cell) of the BS and enters a coverage area (cell) of another (neighboring) BS, a communication connection switching of the UE, also referred to as handover, is conducted in the communication network for changing the connection of the UE to the new BS. A handover may be also conducted in case of other reasons, such as traffic offload, quality improvement, etc.

Besides a classical network environment where plural cells of the same type (e.g. plural macro cells) are arranged in a neighboring manner, new approaches are provided in order to enhance the performance of communication networks. One of these approaches is the implementation of a so-called heterogeneous network structure.

A heterogeneous network may comprise e.g. one or more main communication cells (i.e. macro cells) controlled by one or more communication network control elements, such as a macro cell base station (MBS), MeNB (in LTE or LTE-A networks), and one or more small cells having also an own communication network control element or access network element (also referred to as SBS, SeNB, access point AP etc.). Small cells are referred to, for example, as local area, small cell, pico cell, femto cell, etc. which may be controlled by a corresponding control network element. It is to be noted that the term "small cell" may be also used to describe a low-power radio access node or cell having a range of tens or some hundred meters.

A heterogeneous network structure provides, for example, a greater flexibility with regard to mobility management and an improved coverage area, wherein for example the possibility for offloading from a communication in the macro cell to a small cell is one implementation example. According to some examples, small cells are coupled, for example, to the communication network control element of the macro cell by a backhaul network offering a high capacity path for exchanging data, such as control or even user data, and the like.

SUMMARY

According to an example version of the disclosure, there is provided, for example, an apparatus comprising at least one processor, and at least one memory for storing instructions to be executed by the processor, wherein the at least one memory and the instructions are configured to, with the at least one processor, cause the apparatus at least: to conduct a mobility management processing including a communication connection switching procedure for switching a communication connection of a communication element from a source communication cell to a target communication cell, to prepare mobility management coordination information related to a transmission rate history of the communication element to be switched in the source communication cell, and to cause transmitting the prepared mobility management coordination information towards the target communication cell.

Furthermore, according to an example version of the disclosure, there is provided, for example, a method comprising conducting a mobility management processing including a communication connection switching procedure for switching a communication connection of a communication element from a source communication cell to a target communication cell, preparing mobility management coordination information related to a transmission rate history of the communication element to be switched in the source communication cell, and causing transmitting the prepared mobility management coordination information towards the target communication cell.

According to further refinements, the example versions of the disclosure may comprise one or more of the following features:

the mobility management coordination information may be prepared on the basis of at least one of—information concerning transmission rates of the communication element to be switched in the source communication cell within a predetermined time period before the communication connection switching processing started, —information concerning a total throughput and fairness ratios of all users of the source communication cell, and—information concerning a fairness ratio allocated to the communication element to be switched in the source communication cell;

the mobility management coordination information may further comprise information related to at least one of an indication of a priority level of the communication element to be switched in the source communication cell, an indication related to an allowed change, in the target communication cell, of at least one of a transmission rate and a fairness ratio being allocated in the source communication cell to the communication element to be switched, an indication related to at least one of upper and lower limits of an allowed change, in the target communication cell, of at least one of a transmission rate and a fairness ratio being allocated in the source communication cell to the communication element to be switched, and an indication of parameters related to the mobility of the communication element to be switched;

the transmission of the prepared mobility management coordination information towards the target communication cell may be caused by one of adding an information element comprising the prepared mobility management coordination information to a signaling transmitted towards the target communication cell in the context of the mobility management processing, sending a dedicated signaling towards the target communication cell including the prepared mobility management coordination information via an interface between the source communication cell and the target communication cell, and forwarding the prepared mobility management coordination information to the communication element to be switched for forwarding the prepared mobility management coordination information to the target communication cell;

a pre-cache processing for controlling to pro-actively pre-cache data to be transmitted to the communication element to be switched in a buffer of the communication element to be switched may be conducted, wherein in the mobility management coordination information at least one setting information related to the pre-cache processing may be included; the pre-cache processing may further comprise predicting at least one candidate target cell for switching the communication connection of the communication element on the basis of mobility parameters of the communication element to be switched, determining whether a data transmission capability of the at least one predicted candidate cell is sufficient for the pre-cache processing, and if the data transmission capability is sufficient, and causing transmitting, to the at least one candidate target cell, an indication that pre-caching of data into the buffer of the communication element, after being switched to the target cell, is to be conducted;

the above described measures may be implemented in a first communication network control element of a communication cell acting as the source communication cell, wherein the target communication cell may be controlled by a second communication network control element, wherein the communication element may be a terminal device or user equipment capable of communicating in the source communication cell and the target communication cell.

According to another example version of the disclosure, there is provided, for example, an apparatus comprising at least one processor, and at least one memory for storing instructions to be executed by the processor, wherein the at least one memory and the instructions are configured to, with the at least one processor, cause the apparatus at least: to conduct a mobility management processing including a communication connection switching procedure for switching a communication connection of a communication element from a source communication cell to a target communication cell, to receive and process mobility management coordination information related to a transmission rate history of the communication element to be switched in the source communication cell, and to conduct a scheduling processing for the communication element, wherein the scheduling processing considers the mobility management coordination information related to the transmission rate history of the communication element in the source communication cell for scheduling the communication element in the target cell after being switched.

Furthermore, according to an example version of the disclosure, there is provided, for example, a method comprising conducting a mobility management processing including a communication connection switching procedure for switching a communication connection of a communication element from a source communication cell to a target communication cell, receiving and processing mobility management coordination information related to a transmission rate history of the communication element to be switched in the source communication cell, and conducting a scheduling processing for the communication element, wherein the scheduling processing considers the mobility management coordination information related to the transmission rate history of the communication element in the source communication cell for scheduling the communication element in the target cell after being switched.

According to further refinements, the example versions of the disclosure may comprise one or more of the following features:

the processing of the mobility management coordination information may comprise to derive the transmission rate history of the communication element to be switched on the basis of at least one of—information concerning transmission rates of the communication element to be switched in the source communication cell within a predetermined time period before the communication connection switching processing started, —information concerning a total throughput and fairness ratios of all users of the source communication cell, and—information concerning a fairness ratio allocated to the communication element to be switched in the source communication cell;

the processing of the mobility management coordination information may further comprise a determination of information related to at least one of an indication of a priority level of the communication element to be switched in the source communication cell, an indication related to an allowed change, in the target communication cell, of at least one of a transmission rate and a fairness ratio being allocated in the source communication cell to the communication element to be switched, an indication related to at least one of upper and lower limits of an allowed change, in the target communication cell, of at least one of a transmission rate and a fairness ratio being allocated in the source communication cell to the communication element to be switched, an indication of parameters related to the mobility of the communication element to be switched;

the mobility management coordination information may be received by one of receiving an information element comprising the prepared mobility management coordination information in a signaling transmitted from the source communication cell in the context of the mobility management processing, receiving a dedicated signaling from the source communication cell including the mobility management coordination information via an interface between the source communication cell and the target communication cell, and receiving the mobility management coordination information from the communication element to be switched;

the scheduling processing for the communication element may be conducted by using a proportional fairness scheduling algorithm, wherein information derived from the processing of the mobility management coordination information being related to the transmission rate history of the communication element in the source communication cell may be used for calculating parameters of the proportional fairness scheduling algorithm being related to a transmission rate of the communication element;

a pre-cache processing for pro-actively pre-caching data to be transmitted to the communication element to be switched in a buffer of the communication element to be switched may be conducted, wherein the pre-cache processing may be controlled by setting information included in the mobility management coordination information; the pre-cache processing may further comprise receiving and processing an indication that pre-caching of data into the buffer of the communication element, after being switched to the target cell, is to be conducted, and causing transmitting of data to the communication element after being switched for pre-caching the data in the buffer of the communication element; furthermore, a priority level of the communication element for which the pre-caching processing is to be executed may be set on the basis of at least one of a data amount to be transmitted in the pre-caching processing and a delay tolerance value;

the above described mechanism may be implemented in a second communication network control element of a communication cell acting as the target communication cell, wherein the source communication cell may be controlled by a first communication network control element, wherein the communication element may be a terminal device or user equipment capable of communicating in the source communication cell and the target communication cell.

In addition, according to embodiments, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

In the following, some example versions of the disclosure and embodiments are described with reference to the drawings. In the following, different exemplifying examples will be described using, as an example of a communication network, a cellular wireless communication network, such as an LTE or LTE-Advanced based system. However, it is to be noted that the present invention is not limited to an application using such types of communication system, but is also applicable in other types of communication systems, be it wireless systems, wired systems or systems using a combination thereof.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

A basic system architecture of a communication system where example versions and embodiments are applicable may comprise a commonly known architecture of one or more communication networks comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell (macro cell, small cell) and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a BS and a communication network besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to some example versions of the disclosure, a mobility management processing is described which is implementable, for example, but not exclusively, in a heterogeneous network structure where small cells are deployed in combination with macro cells.

Figure 1:
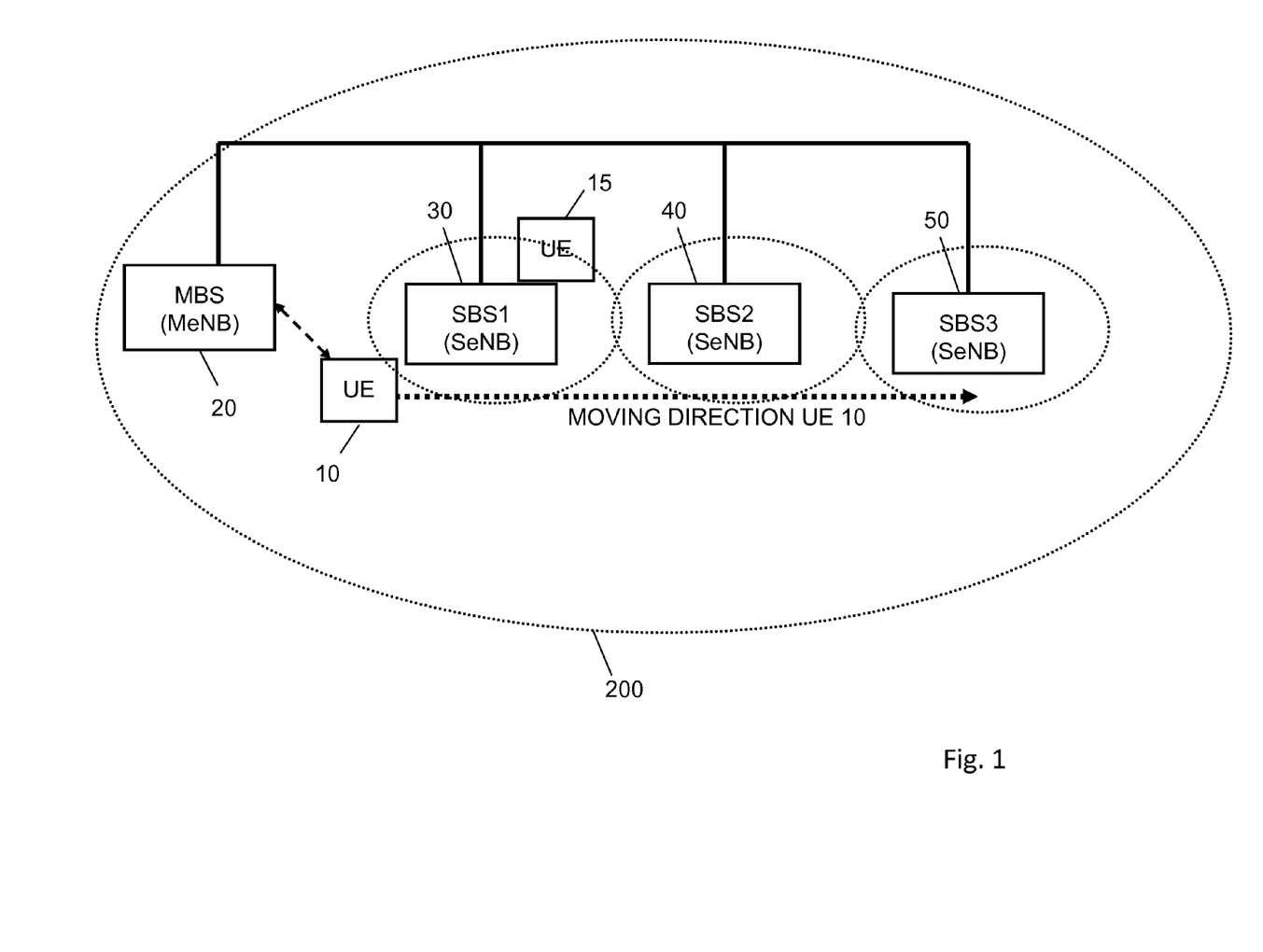
FIG. 1 shows a diagram illustrating a communication network configuration where some example versions of the disclosure are implemented.

With regard to FIG. 1, a diagram illustrating a general configuration of a communication network where some example versions and embodiments are implemented is shown. It is to be noted that the configuration shown in FIG. 1 shows only those devices, network elements and/or parts which are useful for understanding principles underlying the example versions and embodiments. As also known by those skilled in the art there may be several other network elements or devices involved in a communication network which are omitted here for the sake of simplicity.

In FIG. 1, a communication network configuration is illustrated which is for example based on the 3GPP specifications and comprises elements of a heterogeneous network including a primary serving cell (macro cell) and one or more secondary cells (small cells). It is to be noted that there may be also parallel (neighboring) macro cells and small cells which are however omitted for the sake of clarity. It is to be noted that the general functions of the elements described in connection with FIG. 1 as well as of reference points/interfaces between the elements are known to those skilled in the art so that a detailed description thereof is omitted here for the sake of simplicity.

The term "neighboring cell" is to be understood in such a manner that the respective cells have at least partly overlapping coverage areas for their radio connections towards a communication element so that it is possible that an communication element can communicate with the neighboring cell via a radio connection. In other words, neighboring cells are those cells which represent candidates for a handover to and from each other, wherein of course more than two cells can be neighboring cells to each other, depending on the current network architecture, communication conditions, etc.

As shown in FIG. 1, in the exemplary communication network system, a macro cell 200 is provided which is controlled by a communication network control element comprising, e.g. a macro cell base station or eNB (MBS 20)

In the macro cell 200 and connected to the communication network control element MBS 20, one or more small cells are located in a heterogeneous network structure. Specifically, the macro cell 200 includes in the illustrated example three small cells which are controlled by a respective communication network control element, such as a small cell base station (eNB, access network element or the like), i.e. by SBS 30, 40 and 50. It is to be noted that the number of small cells (and respective SBS) is not limited to the number indicated above.

The communication network control elements MBS 20 and SBS 30, 40 and 50 may be connected by suitable interfaces and a backhaul network, for example by means of so-called X2 interfaces which are useable to exchange messages, data and information between the communication network control elements and to enable the nodes to directly communicate with each other.

Furthermore, as indicated in FIG. 1, a communication element or device (UE 10) is located in macro cell 200 wherein it is assumed that the UE 10 moves along a path indicated by a dashed arrow in FIG. 1 so as to cross at least one of the small cells. As a starting point, it is also assumed that a connection between MBS 20 and UE 10 is established (making the macro cell to be the source cell in case of a handover). Furthermore, another UE 15 is depicted which represents a user attached to a small cell (here the cell of SBS 30).

It should be appreciated that according to some examples, a so-called "liquid" or flexible radio concept is employed where the operations and functionalities of a communication network control element or of another entity of the communication network, such as of one or more of the shown BS or eNBs, may be performed in different entities, such as a node, host or server, in a flexible manner. In other words, a "division of labour" between involved network elements or entities may vary case by case. One possible alternative to the example illustrated is, for example, to make a base station or the like to deliver local content.

According to a comparative example being different to the mobility management approach as defined by the example versions of the disclosure, at each time instant, a small cell (i.e. the communication network control element thereof, such as an SBS) schedules a user (i.e. the UE), for example, with the highest instantaneous to average transmission rate ratio.

Assuming now that a new UE, for example a UE of the macro cell, is to be connected to the small cell, e.g. by means of a communication connection switching processing like a handover, in a situation where the small cell is already overloaded. In this case, outages due to the limited spectral resources in the small cell may occur.

UEs can be scheduled by using some fairness criteria which takes into account the average past throughputs of each user. Thus, a certain user experience for each user can be provided. However, in the approach according to the comparative example, once the macro cell UE (MUE) is within the coverage of an overloaded small cell, the small cell does not take into account the MUE's previous transmission rate in the former (i.e. source) cell (i.e., in the present example, the cell of the MBS) to schedule users connected to it. That is, according to the comparative example, once the new user is handed over to the target cell, its previous transmission rate in the source cell is not taken into account. This provides incorrect rate estimates to the target cell for scheduling its users. Hence, the user experience may change if the macro cell and small cell schedulers are working independently. In addition, in mobility management schemes according to comparative examples using, fairness among users may be not existent. For example, a newly handed over MUE may get the same priority as users being already present in the target (e.g. small cell). However, the prior rate history of that very MUE is not leveraged. As a result, users may incur outages, and the overall network performance may also decrease.

Thus, according to example versions of the disclosure, a mobility management mechanism is provided in which the source and target cells are enabled to coordinate each other with regard to a scheduling of a user which is handed over (i.e. switched) to the target cell.

That is, according to some example versions of the disclosure, the source cell is configured to communicate information related to the previously calculated transmission rate of the UE when yet communicating in the source cell to the target cell in which the UE will communicate after the handover or the like. This information exchange allows the target cell to improve the scheduling decisions which are based on parameters like traffic load, users' velocities, and quality-of-service requirements. In addition, it is also possible to achieve a better fairness lever compared to an uncoordinated mobility approach without such information exchange between both source and target cells. Thus, according to example versions of the disclosure, it is possible to improve the mobility management control in communication networks, in particular heterogeneous networks, by providing an information exchange between the source and target cells, so that the total network throughputs can be improved and users are better served according to their QoS requirements. Hence, the mobility management processing introducing the coordination procedure according to some example versions of the disclosure allows that the quality of user experience will continue after the handover in the form of fairness and that the overall network-wide performance stays at a certain level.

Figure 2:
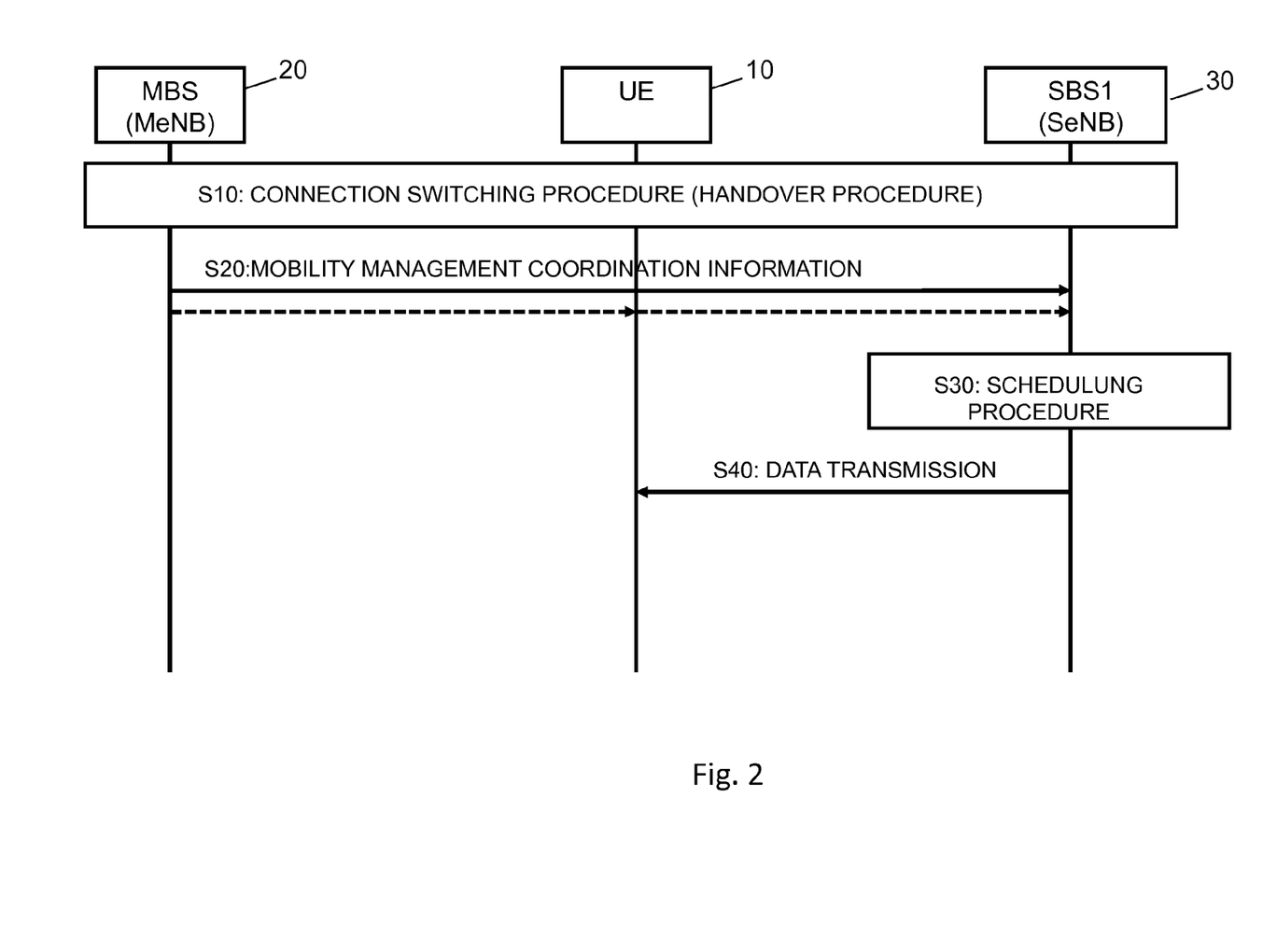
FIG. 2 shows a signaling diagram illustrating a mobility management procedure according to some example versions of the disclosure.

FIG. 2 shows a signaling diagram illustrating a mobility management procedure according to some example versions of the disclosure which is based on the network structure shown in FIG. 1. Specifically, in FIG. 2, a mobility management procedure is depicted where, for coordination purpose, the cell being a source cell in a handover procedure (in the described example the macro cell 200 controlled by the MBS 20) exchanges information with the target cell (in the described example the small cell controlled by the SBS 30) regarding the transmission rate history of the UE 10 which is assumed to be switched to the target cell. That is, information being used as mobility management coordination information refers to, according to example versions of the disclosure, to the prior history of previous transmission rates of the UE before being handed over to its target cell.

As shown in FIG. 2, a connection switching procedure such as a handover procedure is conducted in S10 between the MBS 20 as the control element of the source cell (the macro cell) and the SBS 30 as the control element of the target cell (here, a small cell).

In S20, the MBS 20 prepares the mobility management coordination information for the target cell and sends this information to the target cell. For example, the exchanged information may be explicit in a form of data rates of each MUE (i.e. at least UE 10). Alternatively, implicit information may be provided, such as information regarding a total throughput of all users of the source cell and fairness ratios of all users of the source cell. As another alternative, an information indicating the fairness ratio of the to-be-handed-over MUE (UE 10) are provided. It is to be noted that the latter option is useful for decreasing the amount of information exchange. In addition, that information is already available at the macro cell.

It is to be further noted that additional information may be provided with the mobility management coordination information.

For example, the information may also include limits on how much the UE's 10 data rate or fairness value can be changed in the handover. According to some example versions, corresponding limits may be related, for example, to a percentage value of the data rate or fairness ratio in the macro cell. Furthermore, the limits may depend on a priority level of the UE 10 given in the source cell, wherein both upper and lower limit may be included. As a result, values may increase or decrease.

Furthermore, according to some example versions of the disclosure, information regarding a priority value of the UE 10 may be provided. For example, the priority information may be used as a multiplier, weighting factor etc. in a scheduling algorithm used on the target cell side. It is to be noted that the priority of the UE may change in the handover, depending on both fairness and network management policy in use at the target cell.

In addition, as further information provided by the mobility management coordination information, other useful parameters may be provided. For example, information related to the mobility of the user in question, such as a velocity value of user may be exchanged between the base stations of the source cell and the target cell.

As indicated in connection with S20, the signaling required for transmitting the mobility management coordination information can be exchanged directly between the base stations, e.g. added as additional information element to the handover signaling informing the parameters used in the MBS scheduler via X2 interface. Another other option is that the source cell informs the UE 10 about the used parameters, and the UE 10 informs the target cell about these parameters (indicated in FIG. 2 at S20 by dashed arrows).

In S30, the SBS 30 of the target cell uses the received mobility management coordination information in the scheduling processing so as to have better context information for scheduling the users.

For instance, in case the UE 10 has a very good average transmission rate in its source cell prior to the handover to the target cell, the target cell (i.e. the SBS 30) assigns a lower priority to the UE 10 as compared to other small cell users, such as UE 15. As a result, the other users in the small cell of SBS 30, who have thus a higher priority, can be served without compromising their QoS. Otherwise, for example, in case priority information are also provided indicating that the UE 10 belongs to a priority user, the priority may be continued also in the small cell and considered in the scheduling processing.

According to some example versions of the disclosure, the scheduling processing in S30 is based, for example, on a proportional fairness scheduling algorithm, in which the transmission order of data waiting for transmission is controlled based on an instantaneous transmission rate and an average transmission rate of data to each UE. That is, in the proportional fairness scheduling algorithm with which transmission queues are assigned depending on change in instantaneous radio quality in DL of each UE while fairness among each UE is supported.

For example, in S30, at every time instant, the SBS 30 schedules (e.g. on the basis of a proportional fairness scheduling algorithm) a user i* with the highest instantaneous to average transmission rate ratio, i.e., $$i^* = \operatorname{argmax}_i \frac{r_{i,SBS}(t)}{\overline{R}_{i,SBS}(t)}, \quad (1)$$

where $r_{i,SBS}(t)$ is the i-th UE instantaneous rate in target cell SBS 30 and $\overline{R}_{i,SBS}(t)$ is the i-th long-term transmission rate.

Based on the information provided in the mobility management coordination information, the SBS 30 sets for the long-term transmission rate the following expression:

$$\overline{R}_{i,SBS}(t) = \frac{1}{T} r_{i,SBS}(t-1) + \left(1 - \frac{1}{T}\right) \overline{R}_{i,MBS}(t-1); \quad (2)$$

where $\overline{R}_{i,MBS}(t)$ is the average rate of the UE-i in the MBS (i.e. the source cell), and T is an observation time window for the long-term rate estimation (which may be fixed or dynamically set in the SBS). It is to be noted that $\overline{R}_{i,MBS}(t)$ which is the average rate of a UE when served by the source cell (for example the MBS), when the ith-UE is handed over to the target cell (e.g. SBS), this average rate value is given to the target cell. According to different example versions of the disclosure, this value can be explicitly or implicitly exchanged between source and target cells.

In this connection, it is to be noted that without a mobility management coordination information processing, once the UE 10 moves to the small cell of SBS 30, the term $\overline{R}_{i,MBS}(t-1)=0$. As a result, this provides an incorrect estimate to the SBS.

In S40, based on the scheduling processing of S30, the SBS 30 transmits data towards the UE 10 at time instants determined by the scheduling.

Thus, by considering a data transmission rate history in the source cell, a network-wide capacity and fairness among users can be improved.

As indicated above, the mobility management coordination information may comprise in a scheduled parameters list other parameters, like a velocity of user. Such parameters may be used, for example, in a further enhancement of the above described coordination-based mobility management procedure.

For example, according to further example versions of the disclosure, a pre-cache processing may be implemented which is proactive and based on a prediction of a user movement (i.e. which cells are candidate cells for a handover).

According to some example versions of the disclosure, pre-cache processing is related to a data flow control which is executed before the actual scheduling takes place, i.e. data flows which are serving scheduling queues.

For example, in case the communication network control element of the source cell (here the macro cell) knows in advance that e.g. the next visited (small) cell is overloaded, the MBS 20 conducts a pre-cache processing so as to pre-cache data (i.e. content) in a memory or cache of the UE 10 before making the handover.

This is useful, for example, in a chain of small cells (as indicated in FIG. 1 by small cells of SBS 30, 40, 50, where the load of each small cell may vary largely. However, coverage areas (ranges) of the small cells are also small, so that the UE 10, being moved along the dashed arrow, may stay in a particular small cell only for a short period of time. When applying proactive pre-caching, the delivery of user's data can be distributed among the chain of small cells. That is, data are pre-cached in small cells being lightly-loaded and having thus a high throughput capability (e.g. cells of SBS 30 and 50), while in small cells being e.g. overloaded or having an insufficient communication capability (e.g. cell of SBS 40), the pre-cached data are consumed locally in the UE 10 from a corresponding memory, e.g. its local playout buffer.

The distributed delivery mechanism used in the pre-cache processing is controlled, for example, in the scheduler of the respective cell's communication network control element by means of a priority level used in the scheduling algorithm for scheduling the UE. For example, the respective priority level may depend on a buffer size and delay tolerance for pre-caching.

The mobility management procedure using also the pre-cache procedure may be useful, for example, in a case when users are watching videos, in which knowing user's next cell allows for a more efficient resource allocation supports in improving the user's quality experience. In addition, handover failures are minimized and ping-pongs are avoided.

For example, according to some example versions of the disclosure, the pre-cache processing comprises a determination of candidate cells for a handover of the UE 10, e.g. based on mobility information determined for the UE. Then, it is determined which amount of data can be provided in the candidate cell when the UE 10 is handed over. This depends, for example, on the load situation in the candidate cell (low or high throughput), but also on the time the UE 10 stays in the coverage area of the candidate cell (based e.g. on the velocity of the UE 10). Then, it is determined whether the candidate cell fulfills, for example, a certain criteria (such as a threshold of data amount being possible to be transmitted to the UE 10) which indicates that it can be used in the pre-cache processing. Based on this determination, the candidate cell is informed to conduct the pre-cache processing, i.e. to provide the UE 10 with sufficient data to be stored in the cache.

It is to be noted that the pre-cache processing may be conducted by the source cell before making the handover (e.g. by the MBS 20 before switching the connection to SBS 30), or a target cell is controlled to make the pre-cache processing (i.e. the MBS 20 instructs e.g. SBS 30 to transmit data to the UE 10 so that pre-caching can be made).

Figure 3:
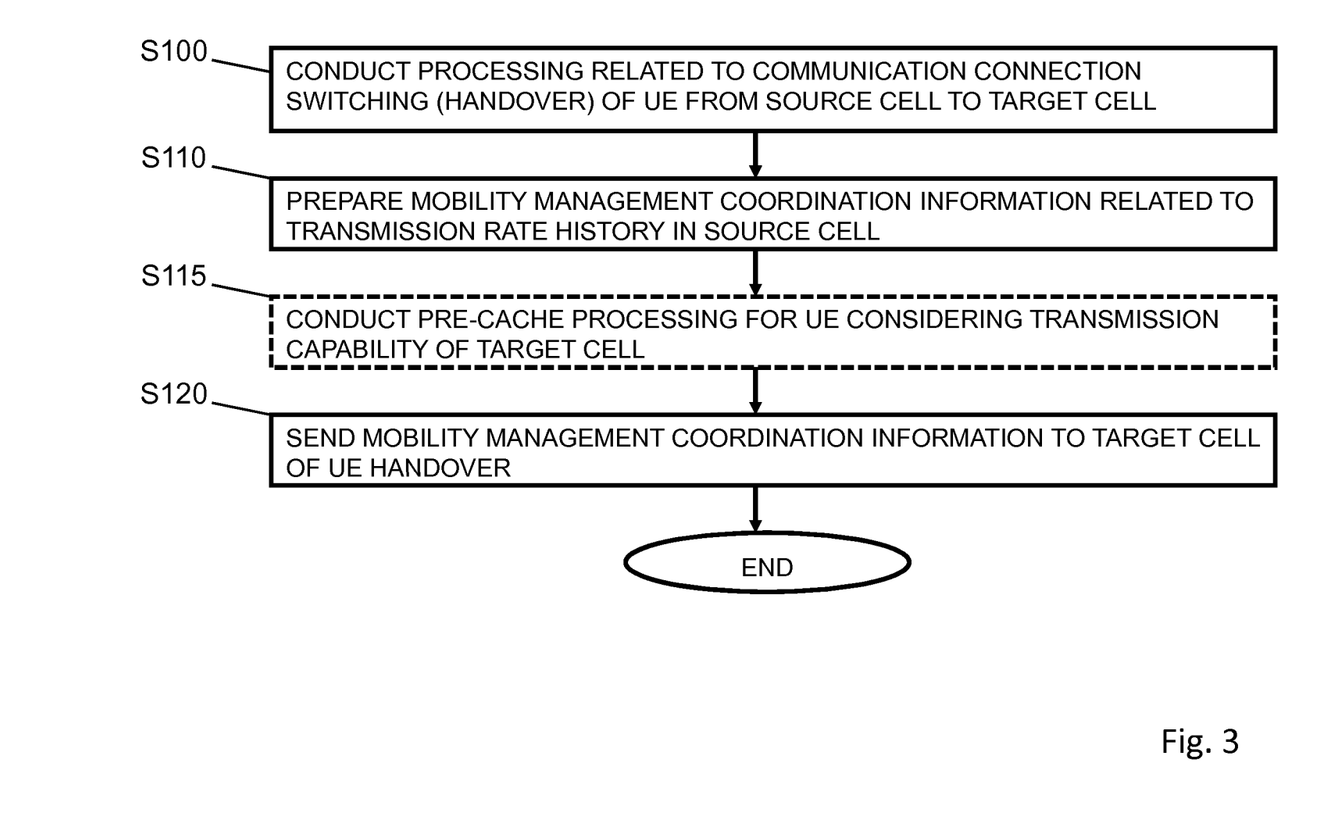
FIG. 3 shows a flow chart of a processing conducted in a communication network control element of a communication cell acting as a source cell in a mobility management procedure according to some example versions of the disclosure.

FIG. 3 shows a flow chart of a processing conducted in a communication network control element (e.g. MBS 20) of a communication cell acting as a source cell in a mobility management procedure according to some example versions of the disclosure.

In S100, a mobility management processing including a communication connection switching procedure for switching a communication connection of a communication element (UE) from a source communication cell (e.g. macro cell) to a target communication cell (e.g. small cell) is conducted. According to some example versions of the disclosure, a handover procedure for the UE 10 is conducted, for example.

During or after the communication switching procedure, in S110, mobility management coordination information related to a transmission rate history of the communication element to be switched in the source communication cell is prepared in the source cell.

For example, the mobility management coordination information is based on information concerning (previous) transmission rates of the communication element to be switched in the source communication cell, i.e. transmission rates of the UE within a predetermined time period before the handover is conducted, i.e. the communication connection switching processing has been started. Alternatively, the mobility management coordination information is based on information concerning a total throughput of all users and fairness ratios of all users of the source communication cell. As a further alternative, the mobility management coordination information is based on information concerning a fairness ratio allocated to the UE to be switched in the source communication cell before the handover.

In addition, the mobility management coordination information may further comprise other information. For example, according to some example versions of the disclosure, at least one of following information may be included: an indication of a priority level allocated to the UE to be switched in the source communication cell, an indication related to an allowed change, in the target communication cell, of the transmission rate and/or a fairness ratio being allocated in the source communication cell to the communication element to be switched (i.e. an indication in which way corresponding parameters can be changed in the target cell in comparison to previous settings), an indication related to upper and/or lower limits of an allowed change, in the target communication cell, of a transmission rate and/or a fairness ratio being allocated in the source communication cell to the communication element to be switched (i.e. an indication by which amount corresponding parameters can be changed in the target cell in comparison to previous settings), and an indication of parameters related to the mobility of the communication element to be switched, such as a velocity of the UE or the like.

In S120, the prepared mobility management coordination information is transmitted towards the target communication cell. According to some example versions of the disclosure, the prepared mobility management coordination information may be transmitted towards the target communication cell by adding an information element comprising the prepared mobility management coordination information to a signaling transmitted towards the target communication cell in the context of the mobility management processing, i.e. during the handover processing signaling. Alternatively, a dedicated signaling may be transmitted towards the target communication cell (during or after the handover procedure) which includes the prepared mobility management coordination information, wherein the dedicated signaling can be transmitted, according to some example versions of the disclosure, via a specific interface between communication network elements of the source communication cell and the target communication cell (such as an X2 interface). Alternatively, the prepared mobility management coordination information may be forwarded to the UE to be switched and from there forwarded to the target communication cell, e.g. after the handover is completed.

It is to be noted that as a further option, as indicated by S115, a further processing may be executed which is related to a pre-cache processing for controlling to pro-actively pre-cache data to be transmitted to the UE to be switched in a buffer of the UE. According to some example versions including this processing option of pre-caching, the mobility management coordination information comprises in addition setting information related to the pre-cache processing which are transmitted to the target cell.

According to some example version, the pre-cache processing comprises, for example, a prediction of one or more candidate target cells for switching the communication connection of the UE, for example, on the basis of mobility parameters of the UE to be switched or measurements used for switching. When the candidate cells are determined, it is determined whether a data transmission capability of the candidate cell(s) is sufficient for the pre-cache processing, i.e. whether the data throughput is sufficient for the pre-caching processing. If this is the case, the communication network control element sends to the thus determined candidate target cell an indication that pre-caching of data into the buffer of the UE is to be conducted when the UE is switched to this target cell.

Figure 4:
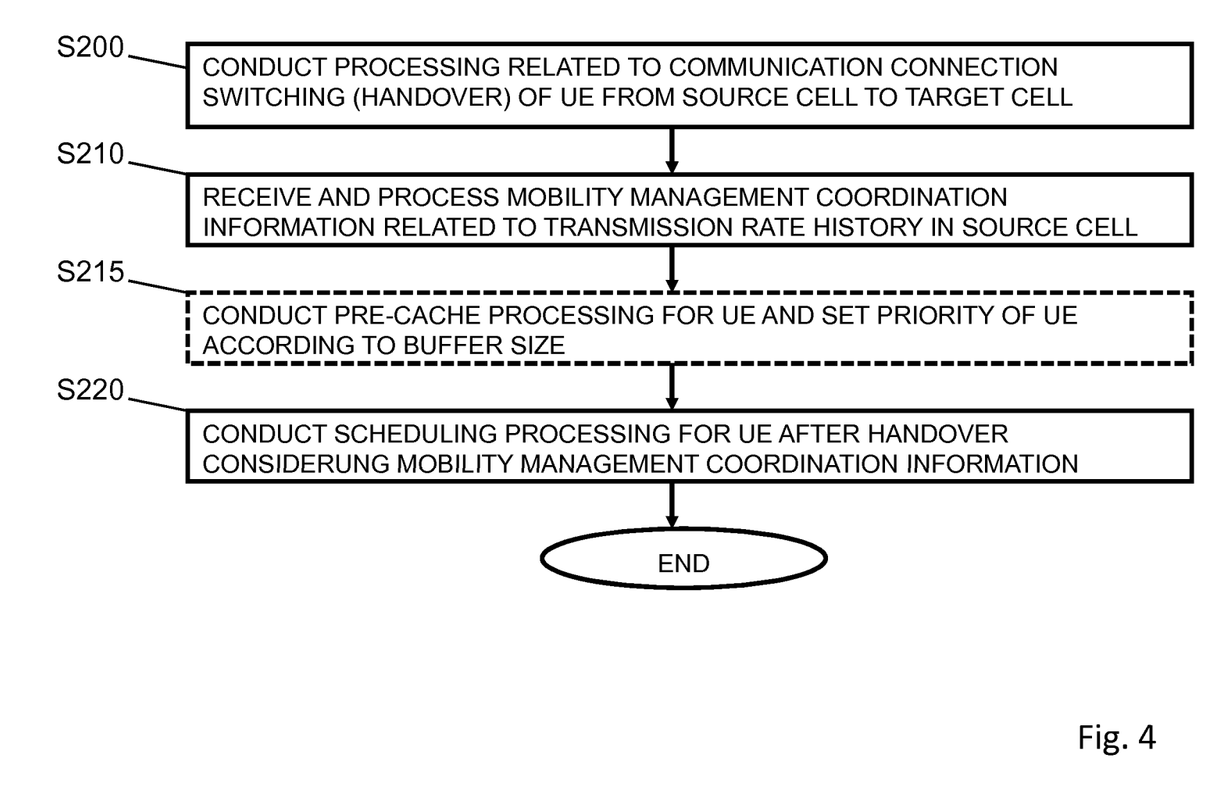
FIG. 4 shows a flow chart of a processing conducted in a communication network control element of a communication cell acting as a target cell in a mobility management procedure according to some example versions of the disclosure.

FIG. 4 shows a flow chart of a processing conducted in a communication network control element (e.g. SBS 30) of a communication cell acting as a target cell in a mobility management procedure according to some example versions of the disclosure.

In S200, a mobility management processing including a communication connection switching procedure for switching a communication connection of a communication element (UE) from a source communication cell (e.g. macro cell) to a target communication cell (e.g. small cell) is conducted. According to some example versions of the disclosure, a handover procedure for the UE 10 is conducted, for example.

During or after the communication switching procedure, in S210, mobility management coordination information related to a transmission rate history of the communication element to be switched in the source communication cell is received and processed by the target cell.

For example, according to some example versions of the disclosure, the mobility management coordination information is received by means of an information element comprising the mobility management coordination information in a signaling received from the source communication cell in the context of the mobility management processing, i.e. during the handover processing signaling. Alternatively, a dedicated signaling may be received from the source communication cell (during or after the handover procedure) which includes the mobility management coordination information, wherein the dedicated signaling can be received, according to some example versions of the disclosure, via a specific interface between communication network elements of the source communication cell and the target communication cell (such as an X2 interface). Alternatively, the mobility management coordination information may be forwarded by the UE to be switched, e.g. after the handover is completed.

Furthermore, the processing of the mobility management coordination information comprises to derive the transmission rate history of the communication element to be switched on the basis of information concerning (previous) transmission rates of the communication element to be switched in the source communication cell, i.e. transmission rates of the UE within a predetermined time period before the handover is conducted, i.e. the communication connection switching processing has been started. Alternatively, the processing of the mobility management coordination information comprises to derive the transmission rate history of the communication element to be switched on the basis of information concerning a total throughput of all users and fairness ratios of all users of the source communication cell. As a further alternative, the processing of the mobility management coordination information comprises to derive the transmission rate history of the communication element to be switched on the basis of information concerning a fairness ratio allocated to the UE to be switched in the source communication cell before the handover.

In addition, the processing of the mobility management coordination information may further comprise a determination of other information. For example, according to some example versions of the disclosure, at least one of following information may be determined: an indication of a priority level allocated to the UE to be switched in the source communication cell, an indication related to an allowed change, in the target communication cell, of the transmission rate and/or a fairness ratio being allocated in the source communication cell to the communication element to be switched (i.e. an indication in which way corresponding parameters can be changed in the target cell in comparison to previous settings), an indication related to upper and/or lower limits of an allowed change, in the target communication cell, of a transmission rate and/or a fairness ratio being allocated in the source communication cell to the communication element to be switched (i.e. an indication by which amount corresponding parameters can be changed in the target cell in comparison to previous settings), and an indication of parameters related to the mobility of the communication element to be switched, such as a velocity of the UE or the like.

In S220, a scheduling processing for the UE being switched to the target cell is conducted. The scheduling processing considers the mobility management coordination information related to the transmission rate history of the communication element in the source communication cell for scheduling the UE. For example, according to some example versions of the disclosure, the scheduling processing for the UE is based on a proportional fairness scheduling algorithm, wherein information derived from the processing of the mobility management coordination information being related to the transmission rate history of the UE in the source communication cell are used for calculating parameters related to a transmission rate of the communication element in the proportional fairness scheduling algorithm.

It is to be noted that as a further option, as indicated by S215, a further processing may be executed which is related to a pre-cache processing for controlling to pro-actively pre-cache data to be transmitted to the UE to be switched in a buffer of the UE. According to some example versions including this processing option of pre-caching, the mobility management coordination information comprises setting information related to the pre-cache processing which is used in the target cell for controlling the pre-cache processing.

According to some example version, the pre-cache processing further comprises receiving and processing an indication that pre-caching of data into the buffer of the UE, after being switched to the target cell, is to be conducted. On this basis, data are transmitted to the UE after being switched for pre-caching the data in the buffer of the UE. For example, according to some example versions of the disclosure, a priority level of the UE for which the pre-caching processing is to be executed is set on the basis of a data amount to be transmitted in the pre-caching processing, i.e. a buffer size to be transmitted. Alternatively, other parameters, such as a delay tolerance value, are used for setting the priority level.

Figure 5:
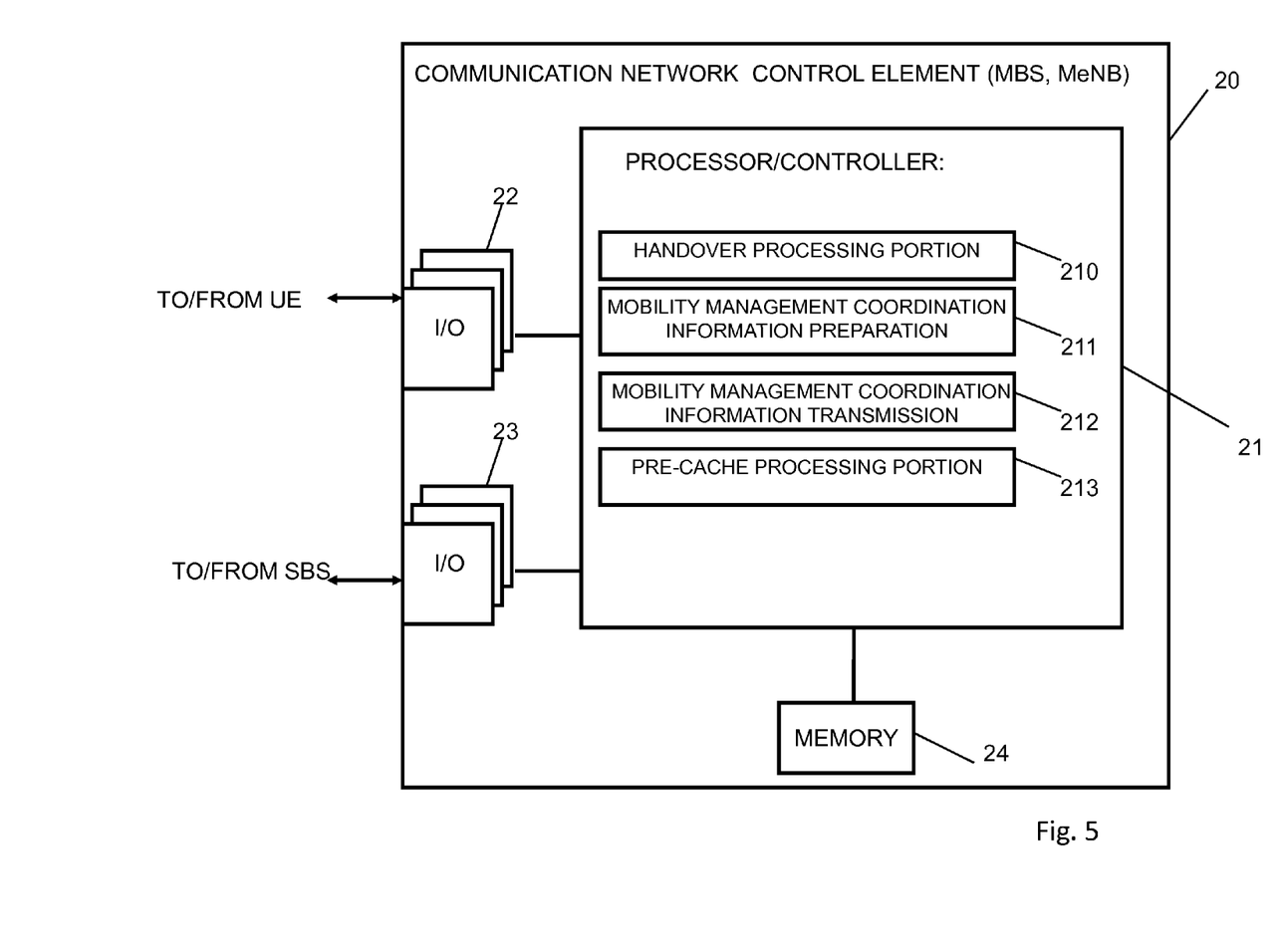
FIG. 5 shows a diagram of a communication network control element of a communication cell acting as a source cell in a mobility management procedure according to some example versions of the disclosure.

In FIG. 5, a diagram illustrating a configuration of a communication network control element of a communication cell acting as a source cell in a mobility management procedure according to some example versions of the disclosure is shown, which is configured to implement the mobility management control procedure as described in connection with some of the example versions of the disclosure. It is to be noted that the communication network control element like the MBS 20 shown in FIG. 5 may comprise further elements or functions besides those described herein below. Furthermore, even though reference is made to a base station or eNB, the communication network control element may be also another device having a similar function, such as a chipset, a chip, a module etc., which can also be part of a BS or attached as a separate element to a BS, or the like. It should be understood that each block and any combination thereof may be implemented by various means or their combinations, such as hardware, software, firmware, one or more processors and/or circuitry.

The communication network control element shown in FIG. 5 may comprise a processing function, control unit or processor 21, such as a CPU or the like, which is suitable for executing instructions given by programs or the like related to the mobility management control procedure. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 22 and 23 denote transceiver or input/output (I/O) units (interfaces) connected to the processor 21. The I/O units 22 may be used for communicating with one or more communication elements like UEs. The I/O units 23 may be used for communicating with other communication network control elements, e.g. with a SBS, another MBS, or the like. The I/O units 22 and 23 may be a combined unit comprising communication equipment towards several network elements, or may comprise a distributed structure with a plurality of different interfaces for different network elements. Reference sign 24 denotes a memory usable, for example, for storing data and programs to be executed by the processor 21 and/or as a working storage of the processor 21.

The processor 21 is configured to execute processing related to the above described communication procedure. In particular, the processor 21 comprises a sub-portion 210 as a processing portion which is usable for conducting a communication connection switching processing of a communication element (UE), such as a handover processing. The portion 210 may be configured to perform processing according to S100 of FIG. 3. Furthermore, the processor 21 comprises a sub-portion 211 usable as a portion for preparing mobility management coordination information. The portion 211 may be configured to perform processing according to S110 of FIG. 3. Furthermore, the processor 21 comprises a sub-portion 212 usable as a portion for transmitting the mobility management coordination portion. The portion 212 may be configured to perform a processing according to S120 of FIG. 3. In addition, the processor 21 may (optionally) comprise a sub-portion 213 usable as a portion for conducting a pre-cache processing. The portion 213 may be configured to perform a processing according to S115 of FIG. 3.

Figure 6:
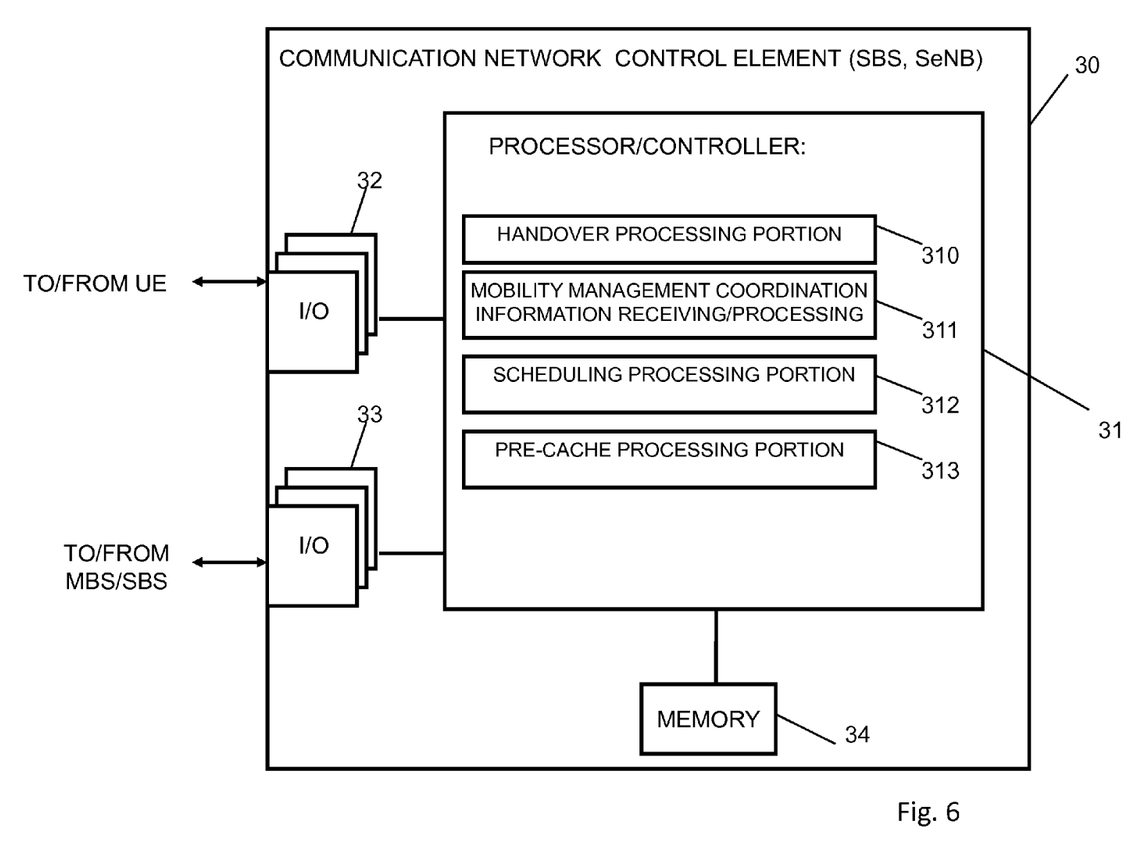
FIG. 6 shows a diagram of a communication network control element of a communication cell acting as a target cell in a mobility management procedure according to some example versions of the disclosure.

In FIG. 6, a diagram illustrating a configuration of a communication network control element of a communication cell acting as a target cell in a mobility management procedure according to some example versions of the disclosure is shown, which is configured to implement the mobility management control procedure as described in connection with some of the example versions of the disclosure. It is to be noted that the communication network control element like the SBS 30 shown in FIG. 6 may comprise further elements or functions besides those described herein below. Furthermore, even though reference is made to a base station or eNB, the communication network control element may be also another device having a similar function, such as a chipset, a chip, a module etc., which can also be part of a BS or attached as a separate element to a BS, or the like. It should be understood that each block and any combination thereof may be implemented by various means or their combinations, such as hardware, software, firmware, one or more processors and/or circuitry.

The communication network control element shown in FIG. 6 may comprise a processing function, control unit or processor 31, such as a CPU or the like, which is suitable for executing instructions given by programs or the like related to the mobility management control procedure. The processor 31 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 32 and 33 denote transceiver or input/output (I/O) units (interfaces) connected to the processor 31. The I/O units 32 may be used for communicating with one or more communication elements like UEs. The I/O units 33 may be used for communicating with other communication network control elements, e.g. with a MBS, another SBS or the like. The I/O units 32 and 33 may be a combined unit comprising communication equipment towards several network elements, or may comprise a distributed structure with a plurality of different interfaces for different network elements. Reference sign 34 denotes a memory usable, for example, for storing data and programs to be executed by the processor 31 and/or as a working storage of the processor 31.

The processor 31 is configured to execute processing related to the above described communication procedure. In particular, the processor 31 comprises a sub-portion 310 as a processing portion which is usable for conducting a communication connection switching processing of a communication element (UE), such as a handover processing. The portion 310 may be configured to perform processing according to S200 of FIG. 4. Furthermore, the processor 31 comprises a sub-portion 311 usable as a portion for receiving and processing mobility management coordination information. The portion 311 may be configured to perform processing according to S210 of FIG. 4. Furthermore, the processor 31 comprises a sub-portion 312 usable as a portion for conducting a scheduling processing. The portion 312 may be configured to perform a processing according to S220 of FIG. 4. In addition, the processor 31 may (optionally) comprise a sub-portion 313 usable as a portion for conducting a pre-cache processing. The portion 313 may be configured to perform a processing according to S215 of FIG. 4.

According to a further example versions of the disclosure, there is provided an apparatus comprising processing means for conducting a mobility management processing including a communication connection switching procedure for switching a communication connection of a communication element from a source communication cell to a target communication cell, preparing means for preparing mobility management coordination information related to a transmission rate history of the communication element to be switched in the source communication cell, and transmitting means for causing transmitting the prepared mobility management coordination information towards the target communication cell.

According to an example version of the disclosure, there is provided an apparatus comprising processing means for conducting a mobility management processing including a communication connection switching procedure for switching a communication connection of a communication element from a source communication cell to a target communication cell, receiving and processing means for receiving and processing mobility management coordination information related to a transmission rate history of the communication element to be switched in the source communication cell, and scheduling means for conducting a scheduling processing for the communication element, wherein the scheduling processing considers the mobility management coordination information related to the transmission rate history of the communication element in the source communication cell for scheduling the communication element in the target cell after being switched.

According to a further example versions of the disclosure, there is provided an apparatus (20, 30, 40, 50) comprising means (21, 210) for conducting a mobility management processing including a communication connection switching procedure for switching a communication connection of a communication element (10) from a source communication cell (200) to a target communication cell, means (21, 211) for preparing mobility management coordination information related to a transmission rate history of the communication element (10) to be switched in the source communication cell (200), and means (21, 212) for causing transmitting the prepared mobility management coordination information towards the target communication cell.

Moreover, according to an example version of the disclosure, there is provided an apparatus (20, 30, 40, 50) comprising means (31, 310) for conducting a mobility management processing including a communication connection switching procedure for switching a communication connection of a communication element (10) from a source communication cell (200) to a target communication cell, means (31, 311) for receiving and processing mobility management coordination information related to a transmission rate history of the communication element (10) to be switched in the source communication cell (200), and means (31, 312) for conducting a scheduling processing for the communication element (10), wherein the scheduling processing considers the mobility management coordination information related to the transmission rate history of the communication element (10) in the source communication cell (200) for scheduling the communication element (10) in the target cell after being switched.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor are software code independent and can be specified using any known or future developed programming language, such as a high-level programming language, such as objective-C, C, C++, C#, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units or means or in a distributed fashion, for example, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module comprising such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, comprising a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

For example, while in the above described example versions of the disclosure a case is explained where the source cell is represented by the macro cell 200, so that the mobility management coordination information is provided by the MBS 20, the same processing is also applicable in case of a handover between the small cells or towards the macro cell. In other words, any of the MBS 20 and the SBS 30, 40 and 50 may act as a source cell communication network control element and a target cell communication network control element, wherein the respective processing as described above is to be applied correspondingly. That is, when considering the processing flow as depicted in FIG. 2, a corresponding mobility management procedure is applicable where, for coordination purpose, the cell being a source cell in a handover procedure is a small cell (e.g. that controlled by the SBS 30) which exchanges information with a target cell (e.g. another small cell controlled by SBS 40 etc., or the macro cell controlled by MBS 20) regarding the transmission rate history of the UE 10 which is assumed to be handed over or switched to the respective target cell.

Furthermore, in the above described example versions of the disclosure, as a scheduling algorithm, a proportional fairness scheduling algorithm is mentioned. However, according to some further example versions of the disclosure, also other scheduling algorithms are implementable in the scheduling procedure, as long as parameters related to the transmission rate of the UE in the source cell can be used for calculating a scheduling related value in the target cell.

The invention claimed is:

1. An apparatus comprising:
   at least one processor,
   and
   at least one memory for storing instructions to be executed by the processor, wherein
   the at least one memory and the instructions are configured to, with the at least one processor, cause the apparatus at least to:
   conduct a mobility management processing including a communication connection switching procedure for switching a communication connection of a communication element from a source communication cell to a target communication cell,
   prepare mobility management coordination information related to a transmission rate history of the communication element to be switched in the source communication cell, wherein causing the apparatus to prepare mobility management coordination information is performed on the basis of information concerning a total throughput and fairness ratios of all users of the source communication cell, and
   cause transmitting the prepared mobility management coordination information towards the target communication cell.

2. The apparatus according to claim 1, wherein the at least one memory and the instructions are further configured to, with the at least one processor, cause the apparatus at least to:
   prepare the mobility management coordination information on the basis of at least one of
      information concerning transmission rates of the communication element to be switched in the source communication cell within a predetermined time period before the communication connection switching processing started,
      information concerning a fairness ratio allocated to the communication element to be switched in the source communication cell.

3. The apparatus according to claim 2, wherein the mobility management coordination information further comprises information related to at least one of:
   an indication of a priority level of the communication element to be switched in the source communication cell,
   an indication related to an allowed change, in the target communication cell, of at least one of a transmission rate and a fairness ratio being allocated in the source communication cell to the communication element to be switched,
   an indication related to at least one of upper and lower limits of an allowed change, in the target communication cell, of at least one of a transmission rate and a fairness ratio being allocated in the source communication cell to the communication element to be switched, and
   an indication of parameters related to the mobility of the communication element to be switched.

4. The apparatus according to claim 1, wherein the at least one memory and the instructions are further configured to, with the at least one processor, cause the apparatus at least to:
   cause transmitting the prepared mobility management coordination information towards the target communication cell by one of:
      adding an information element comprising the prepared mobility management coordination information to a signaling transmitted towards the target communication cell in the context of the mobility management processing,
      sending a dedicated signaling towards the target communication cell including the prepared mobility management coordination information via an interface between the source communication cell and the target communication cell, and
      forwarding the prepared mobility management coordination information to the communication element to be switched for forwarding the prepared mobility management coordination information to the target communication cell.

5. The apparatus according to claim 1, wherein the at least one memory and the instructions are further configured to, with the at least one processor, cause the apparatus at least to:
   conduct a pre-cache processing for controlling to proactively pre-cache data to be transmitted to the communication element to be switched in a buffer of the communication element to be switched, and
   include in the mobility management coordination information at least one setting information related to the pre-cache processing, wherein causing the apparatus to conduct a pre-cache processing further comprises causing the apparatus to:
      predict at least one candidate target cell for switching the communication connection of the communication element on the basis of mobility parameters of the communication element to be switched, and
      determine whether a data transmission capability of the at least one predicted candidate cell is sufficient for the pre-cache processing, and
      if the data transmission capability is sufficient, then causing transmitting, to the at least one candidate target cell, an indication that pre-caching of data into the buffer of the communication element, after being switched to the target cell, is to be conducted.

6. An apparatus comprising
   at least one processor,
   and
   at least one memory for storing instructions to be executed by the processor, wherein
   the at least one memory and the instructions are configured to, with the at least one processor, cause the apparatus at least to:
   conduct a mobility management processing including a communication connection switching procedure for switching a communication connection of a communication element from a source communication cell to a target communication cell,
   receive and process mobility management coordination information related to a transmission rate history of the communication element to be switched in the source communication cell, wherein causing the apparatus to process the mobility management coordination information comprises causing the apparatus to derive the transmission rate history of the communication element to be switched on the basis of information concerning a total throughput and fairness ratios of all users of the source communication cell, and conduct a scheduling processing for the communication element, wherein the scheduling processing considers the mobility management coordination information related to the transmission rate history of the communication element in the source communication cell for scheduling the communication element in the target cell after being switched.

7. The apparatus according to claim 6, wherein causing the apparatus to process the mobility management coordination information comprises causing the apparatus to derive the transmission rate history of the communication element to be switched on the basis of at least one of:

information concerning transmission rates of the communication element to be switched in the source communication cell within a predetermined time period before the communication connection switching processing started, information concerning a fairness ratio allocated to the communication element to be switched in the source communication cell.

8. The apparatus according to claim 7, wherein causing the apparatus to process the mobility management coordination information further comprises causing the apparatus to determine information related to at least one of:

an indication of a priority level of the communication element to be switched in the source communication cell, an indication related to an allowed change, in the target communication cell, of at least one of a transmission rate and a fairness ratio being allocated in the source communication cell to the communication element to be switched, an indication related to at least one of upper and lower limits of an allowed change, in the target communication cell, of at least one of a transmission rate and a fairness ratio being allocated in the source communication cell to the communication element to be switched, and an indication of parameters related to the mobility of the communication element to be switched.

9. The apparatus according to claim 6, wherein the at least one memory and the instructions are further configured to, with the at least one processor, cause the apparatus at least to:

receive the mobility management coordination information by one of:

receiving an information element comprising the prepared mobility management coordination information in a signaling transmitted from the source communication cell in the context of the mobility management processing, receiving a dedicated signaling from the source communication cell including the mobility management coordination information via an interface between the source communication cell and the target communication cell, and receiving the mobility management coordination information from the communication element to be switched.

10. The apparatus according to claim 6, wherein the at least one memory and the instructions are further configured to, with the at least one processor, cause the apparatus at least to:

conduct the scheduling processing for the communication element by using a proportional fairness scheduling algorithm, wherein information derived from the processing of the mobility management coordination information being related to the transmission rate history of the communication element in the source communication cell are used for calculating parameters of the proportional fairness scheduling algorithm being related to a transmission rate of the communication element.

11. The apparatus according to claim 6, wherein the at least one memory and the instructions are further configured to, with the at least one processor, cause the apparatus at least to:

conduct a pre-cache processing for pro-actively pre-caching data to be transmitted to the communication element to be switched in a buffer of the communication element to be switched, wherein the pre-cache processing is controlled by setting information included in the mobility management coordination information, wherein causing the apparatus to conduct the pre-cache processing further comprises causing the apparatus to:

receive and process an indication that pre-caching of data into the buffer of the communication element, after being switched to the target cell, is to be conducted, and cause transmitting of data to the communication element after being switched for pre-caching the data in the buffer of the communication element, wherein the at least one memory and the instructions are further configured to, with the at least one processor, cause the apparatus at least to:

set a priority level of the communication element for which the pre-caching processing is to be executed on the basis of at least one of a data amount to be transmitted in the pre-caching processing and a delay tolerance value.

12. A method comprising:

conducting a mobility management processing including a communication connection switching procedure for switching a communication connection of a communication element from a source communication cell to a target communication cell, preparing mobility management coordination information related to a transmission rate history of the communication element to be switched in the source communication cell, wherein the preparing is performed on the basis of information concerning a total throughput and fairness ratios of all users of the source communication cell, and causing transmitting the prepared mobility management coordination information towards the target communication cell.

13. A method comprising:

conducting a mobility management processing including a communication connection switching procedure for switching a communication connection of a communication element from a source communication cell to a target communication cell, receiving and processing mobility management coordination information related to a transmission rate history of the communication element to be switched in the source communication cell, wherein the processing the mobility management coordination information comprises deriving the transmission rate history of the communication element to be switched on the basis of information concerning a total throughput and fairness ratios of all users of the source communication cell, and conducting a scheduling processing for the communication element, wherein the scheduling processing considers the mobility management coordination information related to the transmission rate history of the communication element in the source communication cell for scheduling the communication element in the target cell after being switched.

\* \* \* \* \*

UNITED STATES PATENT AND TRADEMARK OFFICE
CERTIFICATE OF CORRECTION

PATENT NO. : 9,775,074 B2  Page 1 of 1
APPLICATION NO. : 15/027642
DATED : September 26, 2017
INVENTOR(S) : Horneman et al.

It is certified that error appears in the above-identified patent and that said Letters Patent is hereby corrected as shown below:

In Column 21, Line 42, Claim 2, delete "one of" and insert -- one of: --, therefor.

In Column 21, Line 47, Claim 2, delete "started," and insert -- started, and --, therefor.

In Column 22, Line 50, Claim 6, delete "comprising" and insert -- comprising: --, therefor.

In Column 23, Line 23, Claim 7, delete "started," and insert -- started, and --, therefor.

Signed and Sealed this
Twenty-second Day of May, 2018

Andrei Iancu
*Director of the United States Patent and Trademark Office*